US009428093B2

(12) United States Patent
Kupina (10) Patent No.: US 9,428,093 B2
(45) Date of Patent: Aug. 30, 2016

(54) CUP HOLDER ASSEMBLY HAVING DEFORMABLE RETAINER

(71) Applicant: Toyota Motor Engineering & Manufacturing North America, Inc., Erlanger, KY (US)

(72) Inventor: Robert K. Kupina, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/307,882

(22) Filed: Jun. 18, 2014

(65) Prior Publication Data

US 2015/0367765 A1    Dec. 24, 2015

(51) Int. Cl.
*B60N 3/10* (2006.01)

(52) U.S. Cl.
CPC ............... *B60N 3/108* (2013.01); *B60N 3/101* (2013.01)

(58) Field of Classification Search
CPC ...... B60N 3/101; B60N 3/108; B60N 3/105; B60N 3/10; B60N 3/102; B60N 3/103; Y10S 224/926; Y10S 220/903; A47G 23/0216; A47G 23/03; A47G 19/2205; A47G 23/0208; A47G 23/0313
USPC ......... 211/74, 85.18, 71.01, 85.4; 248/311.2; 224/926; 220/737, 738, 632, 903, 220/592.17

See application file for complete search history.

(56) References Cited

U.S. PATENT DOCUMENTS

| | | | | |
|---|---|---|---|---|
| 3,090,478 A | * | 5/1963 | Stanley | 248/128 |
| 3,302,428 A | * | 2/1967 | Paquin | B65D 81/3883 220/903 |
| 4,514,995 A | * | 5/1985 | Curtis | A47G 23/03 150/154 |
| 5,150,946 A | | 9/1992 | Marfilius et al. | |
| 5,372,786 A | * | 12/1994 | Iles | 73/863 |
| 5,395,085 A | | 3/1995 | Mann | |
| 5,533,782 A | | 7/1996 | Goldman | |
| 5,553,733 A | * | 9/1996 | Rosenthal | A47G 29/06 150/154 |
| 5,687,874 A | * | 11/1997 | Omori et al. | 220/737 |
| 5,897,090 A | * | 4/1999 | Smith et al. | 248/311.2 |
| 5,950,698 A | * | 9/1999 | Cristea | B67C 9/00 141/364 |
| 6,050,468 A | * | 4/2000 | Kelley | 224/542 |
| 6,109,580 A | * | 8/2000 | Stern | A47C 7/68 248/311.2 |
| 6,302,364 B1 | * | 10/2001 | Chiueh | 248/311.2 |
| 6,941,601 B2 | * | 9/2005 | DeBartolo | A47G 23/0216 220/737 |
| 7,147,192 B2 | * | 12/2006 | Kong | 248/311.2 |

(Continued)

FOREIGN PATENT DOCUMENTS

CA    2191781 A1    5/1998

*Primary Examiner* — Joshua Rodden
*Assistant Examiner* — Hiwot Tefera
(74) *Attorney, Agent, or Firm* — Dinsmore & Shohl LLP (57) ABSTRACT

The cup holder assembly adapted to retain an object includes a retainer formed of a flexible material. The retainer includes a first upper edge, a first bottom wall, and a first side wall. The first upper edge defines a first open end having a diameter larger than the diameter of the first bottom wall. The first side wall extends between the first bottom wall and the first upper edge to define a frustoconical shape. The first side wall deforms outwardly upon insertion of the object to provide frictional resistance to retain an upright orientation of the object.

14 Claims, 6 Drawing Sheets

(56) References Cited

U.S. PATENT DOCUMENTS

| | | |
|---|---|---|
| 7,225,927 B2 | 6/2007 | Sweeney |
| 7,322,500 B2 * | 1/2008 | Maierholzner ............... 224/486 |
| 7,762,396 B1 | 7/2010 | Yang et al. |
| 8,360,380 B2 * | 1/2013 | Soma et al. ............... 248/311.2 |
| 8,550,550 B2 | 10/2013 | Cassese et al. |
| 8,632,123 B2 | 1/2014 | Barile |
| 8,870,144 B2 * | 10/2014 | Zavattieri et al. ......... 248/311.2 |
| 9,181,015 B2 * | 11/2015 | Booska .............. B65D 81/3484 |
| 2002/0148868 A1 * | 10/2002 | Dion-Bildstein ...... B60N 3/103 224/401 |
| 2006/0118688 A1 * | 6/2006 | Kong ......................... 248/311.2 |
| 2007/0007315 A1 * | 1/2007 | Hanson et al. ................ 224/274 |
| 2007/0221804 A1 * | 9/2007 | Harshman et al. ........ 248/311.2 |
| 2008/0272259 A1 * | 11/2008 | Zavattieri et al. ......... 248/311.2 |
| 2009/0095865 A1 * | 4/2009 | Everhart et al. ........... 248/309.1 |
| 2011/0025105 A1 * | 2/2011 | Henke et al. ............. 297/188.14 |
| 2011/0297715 A1 * | 12/2011 | Kamiya et al. ................ 224/539 |
| 2011/0297717 A1 * | 12/2011 | Kaemmer ..................... 224/567 |
| 2012/0194052 A1 * | 8/2012 | Mclaughlin et al. ......... 312/312 |
| 2013/0119006 A1 | 5/2013 | Graga et al. |
| 2014/0158848 A1 * | 6/2014 | Caruso et al. ............. 248/311.2 |
| 2014/0158852 A1 * | 6/2014 | Andersson ............... 248/346.03 |

* cited by examiner

CUP HOLDER ASSEMBLY HAVING DEFORMABLE RETAINER

FIELD OF THE INVENTION

The present invention is directed to a cup holder assembly, more particularly, a cup holder assembly having a retainer formed of a flexible material that deforms upon insertion of an object to increase frictional resistance thereby providing improved retention of the object within the retainer.

BACKGROUND OF THE INVENTION

It is well known in the art to provide cup holder assemblies having cup holders adapted to receive objects of various diameters and shapes. Such features include spring loaded grippers designed to provide a variable diameter of the cup holder. Other features include inserts having a tiered interior diameter so as to accommodate cups of various sizes. However, there are many disadvantages of the previously known cup holder assemblies.

Specifically, spring loaded grippers are susceptible to damage as movable parts wear upon increased use. Also, the spring grippers can be contaminated by spillage from the cup retained in the cup holder and are difficult to clean.

Further, the ability of inserts to accommodate objects of various diameters is limited to the number of tiers provided by the insert. Moreover, insertion of the object within the insert contained in the cup holder often results in the disengagement of the insert from the cup holder as the insert has attached to the object itself.

In order to prevent the above disadvantages of the known cup holders it has been known to provide the cup holders with various shapes. One such cup holder assembly includes a container support region that has two receptacles for the temporary storage of items. Each receptacle is defined by walls of an upwardly opening blind inverted conical frustum. By selecting a tapered shape, such as a cone, allows the container support region 110 to be stacked for convenient storage when not in use. As the container support region, including the receptacles, are designed to be stacked for convenient storage, the container support region is constructed of a substantially rigid material to resist flexion under its intended use.

Although providing a receptacle formed having an inverted conical frustum shape, which is formed of a rigid material, allows for the receipt of objects of various diameters, the rigid conical frustum fails to provide sufficient engagement between the receptacle and the object to adequately retain a vertical orientation of the object.

As cup holders are often filled with objects filled with a liquid material, it is imperative that the cup holder be able to retain an upright orientation of the object to prevent spillage of the liquid contained therein. Maintaining the proper upright orientation of the object filled with liquid is particularly important in cup holder assemblies designed for automotive vehicles as driving operations often provides an inertia to the object such that cup holder assemblies that fail to maintain the upright orientation of the object result in spillage of liquid contained in the object. The inability of the cup holder assembly to properly retain the object in its upright orientation results in a decreased customer satisfaction.

Thus, there exists a need in the art to provide an improvement over known cup holder assemblies having a structure capable of accommodating objects of various diameter and providing sufficient frictional resistance of the object to maintain an upright orientation.

SUMMARY OF THE INVENTION

The present invention provides an improved cup holder assembly which overcomes the above mentioned disadvantages of the previously known cup holder assemblies which lack sufficient structural configuration to maintain the proper upright orientation of an object of various sizes.

In brief, the cup holder assembly adapted to retain an object includes a retainer formed of a flexible material. The retainer includes a first upper edge, a first bottom wall, and a first side wall. The first upper edge defines a first open end having a diameter larger than the diameter of the first bottom wall. The first side wall extends between the first bottom wall and the first upper edge to define a frustoconical shape. The first side wall deforms outwardly upon insertion of the object to provide frictional resistance to retain an upright orientation of the object.

The retainer optionally includes a second upper edge, a second bottom wall, and a second side wall. The second upper edge defines a second open end having a diameter larger than the diameter of the second bottom wall. The second side wall extends between the second bottom wall and the second upper edge to define a frustoconical shape. The second side wall deforms outwardly upon insertion of the object to provide frictional resistance to retain an upright orientation of the object.

BRIEF DESCRIPTION OF THE DRAWINGS

A better understanding of the present invention will be had upon reference to the following detailed description when read in conjunction with the accompanying drawings wherein like reference characters refer to like parts throughout the several views and in which.

DETAILED DESCRIPTION OF THE INVENTION

The present invention has utility as a cup holder assembly that is able to receive objects of varying diameters and provide sufficient frictional resistance to maintain the proper vertical orientation of the objects. By providing the cup holder assembly with a retainer formed of a flexible material and that has a frustoconical shape, allows objects of varying diameter to be retained. Specifically, due to the formation of the frustoconical shape by a side wall that extends at a predetermined angle of between 25°-35° allows objects of various diameters to be received therein. Smaller diameter objects are received farther within the retainer than objects of larger diameter.

Further, by forming the retainer of a flexible material, the side wall deforms outwardly upon insertion of the object to provide increased frictional resistance to retain an upright orientation of the object. Specifically, upon insertion of the object, the side wall deforms outwardly to conform to the shape of the inserted object. The outward deformation of the side wall provides additional contact between the object and the side wall which increases the frictional resistance between the object and the side wall.

Accordingly, the increased frictional resistance applied by the deformed side wall increases the retention of the object in an upright orientation to avoid spills. The increase in frictional resistance, due to the deformation of the side wall by the insertion of the object, is particularly advantageous in cup holder assemblies provided in automotive vehicles. Specifically, driving operations will apply an inertia force to the object, which typically includes an opening for removing liquids container therein. As such, the increased frictional resistance will maintain an upright orientation to avoid spills during driving operations.

Figure 1:
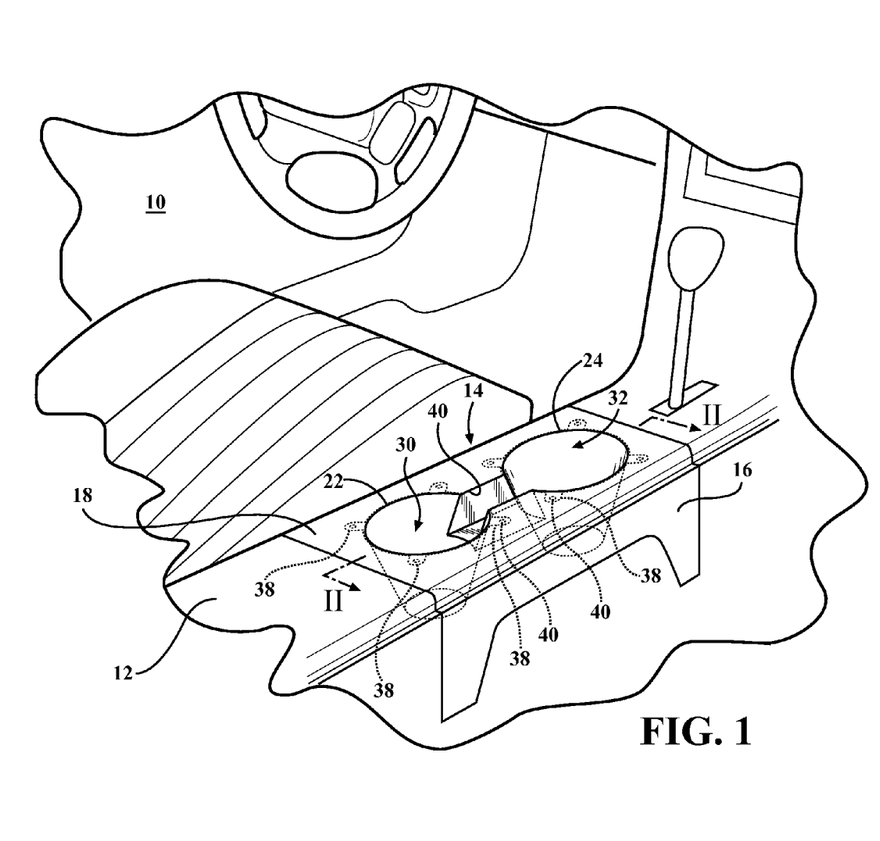
FIG. 1 is a perspective view of a passenger compartment of an automotive vehicle.

As illustrated in FIG. 1, a passenger compartment 10 of an automotive vehicle includes a center console assembly 12 in which the cup holder assembly 14 is provided.

The cup holder assembly 14 is formed as part of the center console 12 or positioned elsewhere in the passenger compartment of the vehicle. It is appreciated, of course, that the cup holder assembly is not limited to the center console assembly of an automotive vehicle and is operable as a cup holder assembly for an armrest, a fixed portion attached to the trim panel assembly of an automotive vehicle, or as a cup holder assembly separate from an automotive vehicle.

Figure 2A:
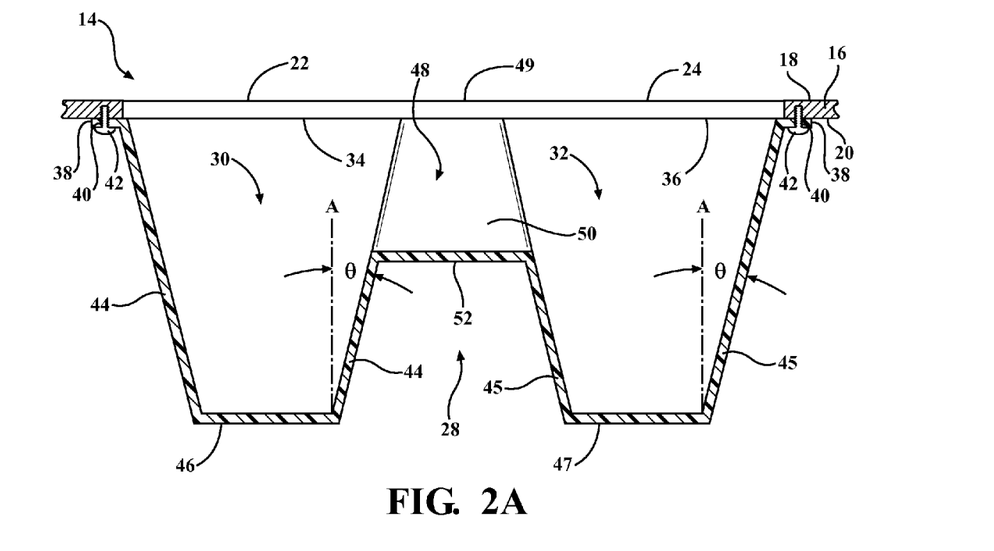
FIG. 2A is a cross-sectional view taken along lines II-II of FIG. 1.

The cup holder assembly 14 includes a housing 16 having an exterior surface 18 and an interior surface 20, as seen in FIG. 2. The housing 16 includes a first aperture 22 extending from the exterior surface 18 to the interior surface 20 of the housing. While the illustrated embodiment illustrates a cup holder assembly 14 having a housing 16 that includes a first aperture 22 and a second aperture 24, it is appreciated, of course, that the cup holder assembly 14 is operable to include a single cup holder.

The cup holder assembly 14 includes a retainer 28 formed of a flexible material. The retainer 28 includes a generally frustoconically shaped first receptacle 30 and a frustoconically shaped second receptacle 32. The first receptacle 30 and second receptacle 32 are the cavities which receive and retain the objects. The first receptacle 30 and the second receptacle 32 are similarly constructed and where possible discussion will be limited to the first receptacle 30.

As described in greater detail below, the retainer 28 is formed of a flexible material and is resiliently deformable such that the retainer 28, specifically the first receptacle 30 or the second receptacle 32, is deformable to conform to the shape of an inserted object.

The first receptacle 30 includes an upper edge 34 and the second receptacle includes an upper edge 36. The upper edge 34 and the upper edge 36 define open ends of the first receptacle 30 and the second receptacle 32, respectively. The open end of the first receptacle 30 corresponds to the first aperture 22 and the open end of the second receptacle 36 corresponds to the second aperture 24.

Figure 3:
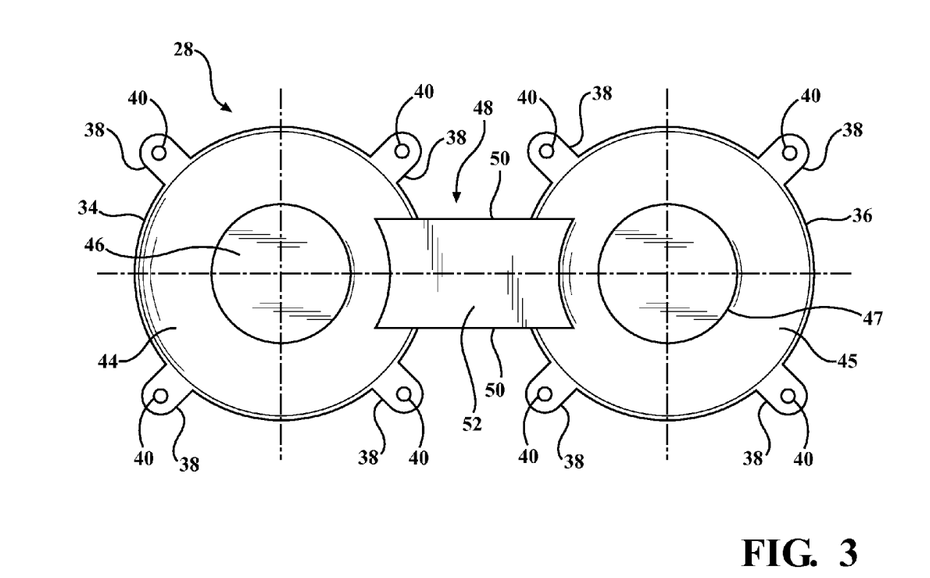
FIG. 3 is a bottom view of the inventive cup holder assembly.

Extending outwardly from the upper edge 34 of the first receptacle 30 and the upper edge 36 of the second receptacle 32 are a plurality of tabs 38. An aperture 40 is provided in each of the tabs 38. The retainer 28 is connected to the interior surface 20 of the housing 16 through the engagement of connectors 42 within the apertures 40 of the tabs 38. In the illustrated embodiment, the connectors 42 are in the form of fasteners; however, the connectors are not limited to such a configuration. The connectors 42 are optionally posts, extending outwardly from the inner surface 20 of the housing 16, which are secured to the tabs 38 through a heat staking process or are optionally separate fasteners or snap fit connectors. The connectors 42 are optionally any connection known to one of ordinary skill in the art to connect one rigid member to a flexible member illustratively including heat stake posts, fasteners, or snap fit tabs.

The first receptacle 30 is defined by the first upper edge 34, a first side wall 44, and a first bottom wall 46. The first side wall 44 extends between the first upper edge 34 and the first bottom wall 46. The first bottom wall 46 has a diameter that is smaller than a diameter of the open upper end formed by the upper edge 34. As the first bottom wall 46 has a diameter that is smaller than the diameter of the open end formed by the first upper edge 34, the first side wall 44 extends at an angle θ to a vertical axis A to define the generally frustoconical shape of the first receptacle 30.

The second receptacle 32 is defined by the second upper edge 36, a second side wall 45, and a second bottom wall 47. The second side wall 45 extends between the second upper edge 36 and the second bottom wall 47. The second bottom wall 47 has a diameter that is smaller than a diameter of the open upper end formed by the second upper edge 36. As the second bottom wall 47 has a diameter that is smaller than the diameter of the open end formed by the second upper edge 36, the second side wall 45 extends at an angle θ to the vertical axis A to define the generally frustoconical shape of the second receptacle 32.

As seen in FIGS. 1, 2A, and 3, the retainer 28 is provided with a continuous recessed portion 48 that connects the first receptacle 30 and a second receptacle 32. The continuous recessed portion 48 is formed by a pair of continuous lateral walls 50 and a continuous traversing wall 52. The continuous pair of lateral walls 50 and continuous traversing wall 52 extending obliquely between the first side wall 44 of the first receptacle 30 and the second side wall 45 of the second receptacle 32.

The continuous recessed portion 48 allows for objects having handles such as mugs to be retained within the cup holder assembly 14. The continuous recessed portion 48 is provided with a width that is narrower than the diameter of the open upper end of the first receptacle 30 and the second receptacle 32. The housing 16 includes a slot 49 that connects the first aperture 22 and the second aperture 24. The slot 49 corresponds to the continuous recessed portion 48.

The continuous recessed portion 48 is formed by the connection of a first pair of lateral walls which extend from the first side wall 44 and a second pair of lateral walls which extend from the second side wall 45. The first pair of lateral walls connects with the second pair of lateral walls to form the continuous pair of lateral walls 50. Similarly, a first traversing wall extending from the first side wall 44 connects with a second traversing wall extending from the second side wall 45 to form the continuous traversing wall 50 that extends between the continuous pair of lateral walls 50 to form the continuous recessed portion 48.

Figure 4:
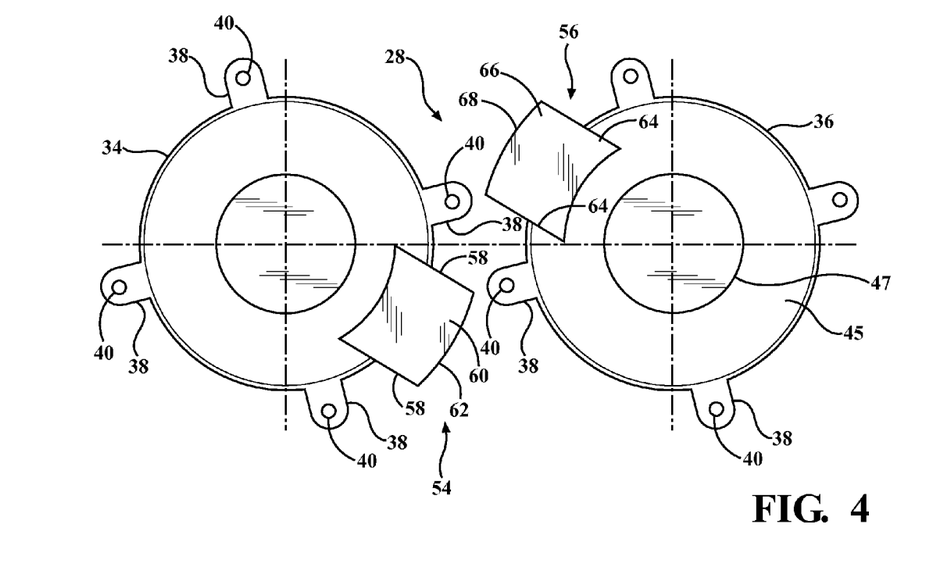
FIG. 4 is a bottom view of the modified cup holder assembly.

Alternatively, as seen in FIG. 4, the retainer 28 in which the first receptacle 30 having a first recessed portion 54 and a second receptacle 32 having a second recessed portion 56. The first recessed portion 54 and the second recessed portion 56 are discontinuous and separate. Specifically, first recessed portion 54 of the first receptacle 30 does not connect with the second recessed portion 56 of the second receptacle 32.

The first recessed portion 54 is formed by a pair of lateral walls 58, a traversing wall 60 that extends between the lower edge of the pair of lateral wall 58, and a rear wall 62. Similarly, the second recessed portion 56 is formed by a pair of lateral walls 64, a traversing wall 66 that extends between the lower edge of the pair of lateral wall 64, and a rear wall 68. The first recessed portion 54 and the second recessed portion 56 are in open communication with the first upper edge 34 and the second upper edge 36 of the first receptacle 30 and the second receptacle 32.

Figure 2B:
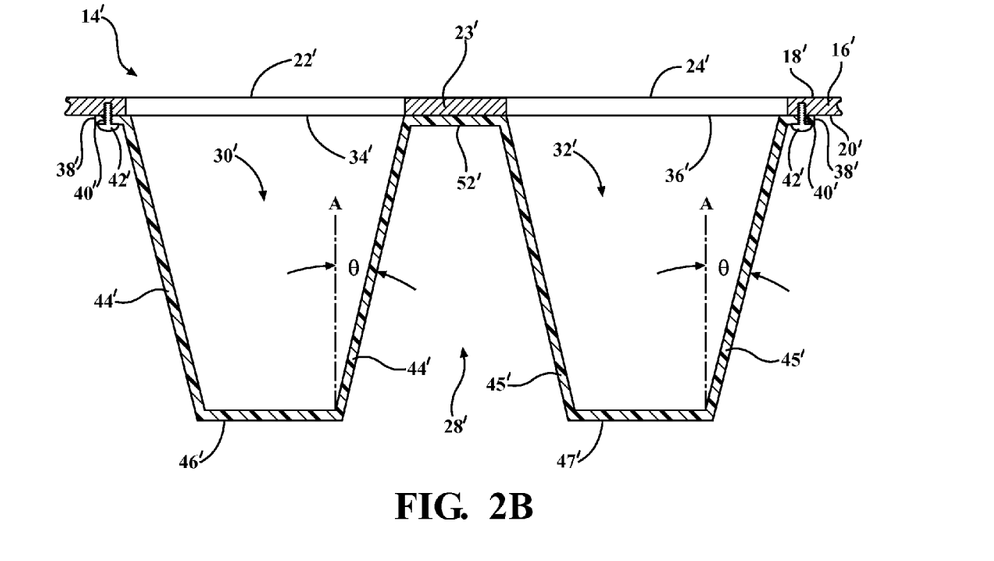
FIG. 2B is a modified cross-sectional view taken along lines II-II of FIG. 1.

With reference to FIG. 2B, an alternative cup holder assembly is generally illustrated at 14'. The cup holder assembly 14' is similar to the cup holder assembly 14 except for the omission of the continuous recessed portion 48. Rather, the housing 16' without the slot 49 that connects the first aperture 22' to the second aperture 24', such that the first aperture 22' to the second aperture 24' are separated. Specifically, the housing 16' includes an extension 23' that extends between the first aperture 22' to the second aperture 24'. Further, the traversing wall 52' is formed so as to extend between the first receptacle 30' and the second receptacle 32' between the upper edge 34' and 36', respectively.

With reference to FIGS. 5A-5E, the insertion of an object and the retention of the object with the proper vertical orientation into the receptacle will be provided. In order to provide a cup holder assembly 14 which is operable of properly retaining an object having various diameters and to ensure the proper vertical orientation, the side wall 44 of the first receptacle 30 and the side wall 45 of the second receptacle 32 are provided at a predetermined angle θ to a vertical axis A. As the first receptacle 30 and the second receptacle 32 are similarly constructed, the discussion will be limited to the first receptacle 30 having the first recessed portion 54.

Figure 5A:
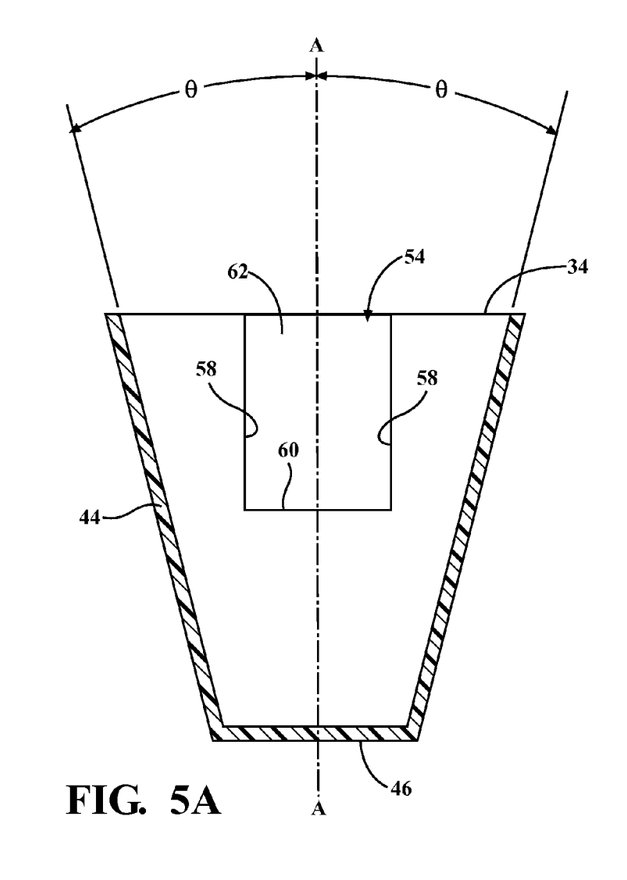
FIG. 5A-5E are cross-sectional views illustrating the insertion of various objects having different diameters within the cup holder assembly.

As seen in FIG. 5A, the side wall 44 is provided with the predetermined angle θ with the vertical axis A. The predetermined angle θ is within a range between 25° and 35°, inclusively. In particular, the predetermined angel θ is set at 30°. The predetermined angle θ is set in order to provide a sufficient range of diameters, in the vertical direction, so as to receive various objects of various diameters and to provide sufficient retention of the objects upon insertion therein. As shown in FIGS. 5B-5E, the range of 25°-35°, allows for the retention of objects having various diameters, specifically, a generic mug having a diameter of 70 mm (FIG. 5B), a generic 20 oz plastic beverage bottle having a diameter of 72 mm (FIG. 5C), a generic 12 oz aluminum can having a diameter of 66 mm (FIG. 5D) and a generic energy drink aluminum can having a diameter of 52 mm (FIG. 5E).

By setting the predetermined angle θ within the range of 25°-35° allows the cup holder assembly 14 to receive and retain objects of diameters ranging from 52 mm to 70 mm. If the angle is widened, the decrease in the surface of the side wall 44 that contacts the object prevents the side wall 44 from having sufficient frictional resistance to retain the object therein. If the angle is narrowed, the diameter of the objects that can be received is limited.

In addition to the formation of first receptacle 30 having a frustoconical shape, retainer 28 is formed of a flexible material capable of deforming outwardly to correspond to the shape of the inserted object. As seen in FIGS. 5B-5E, the insertion of the objects O having various diameters is due to the frustoconical shape; however, the retention of the objects O in the upright vertical orientation is maintained due to the increased frictional resistance between the side wall 44 and the object.

Figure 5B:
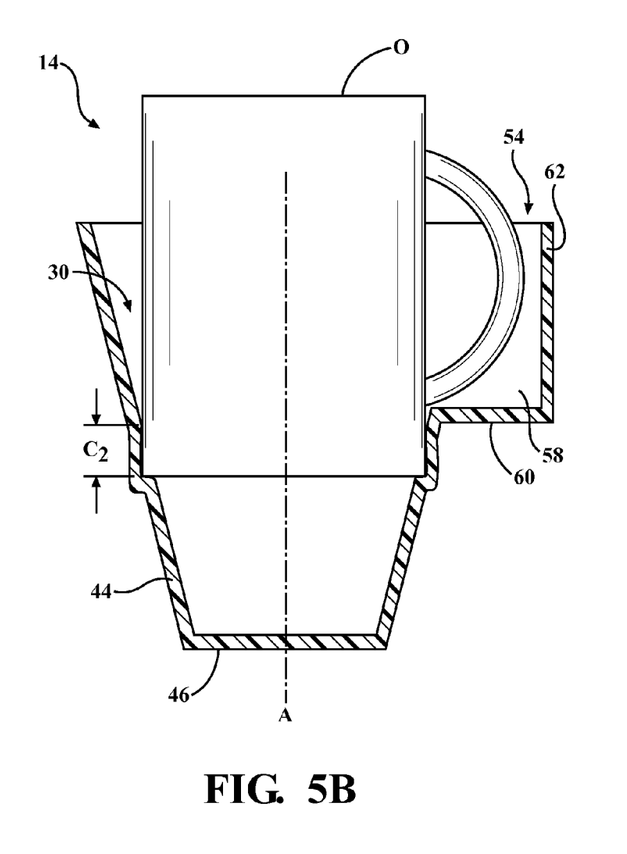
Figure 5C:
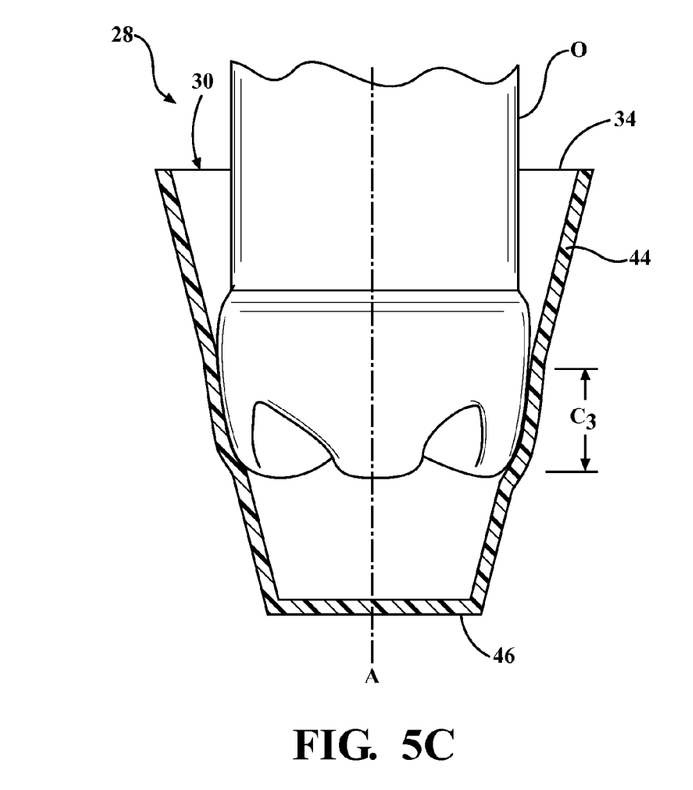
Figure 5D:
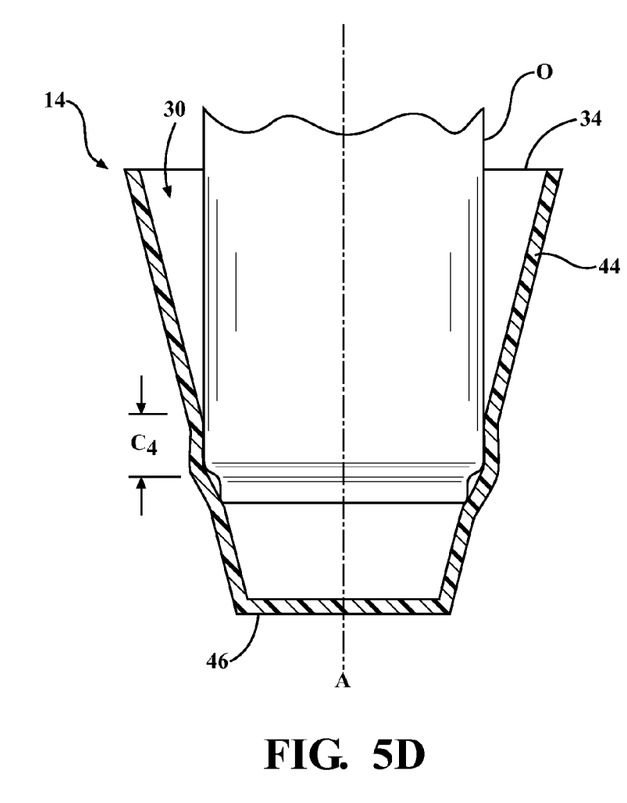
Figure 5E:
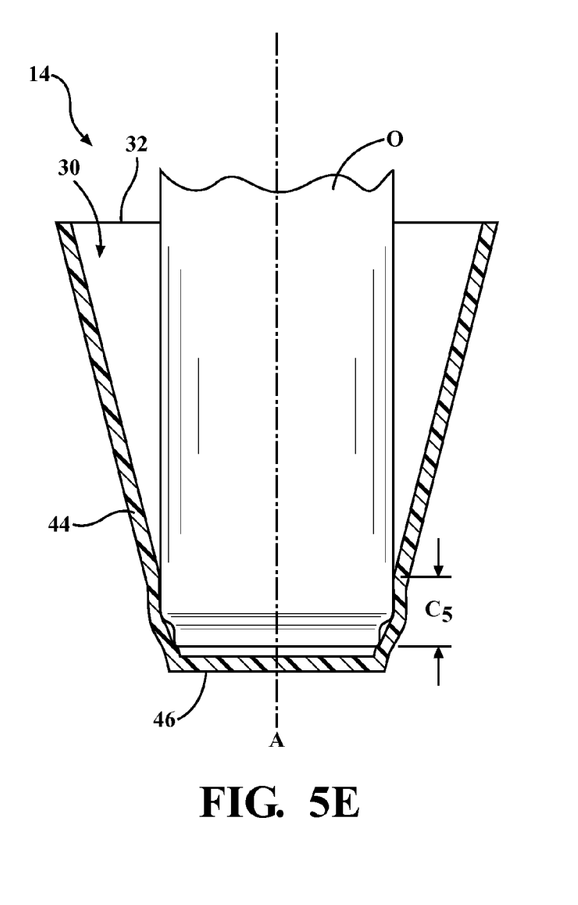

Specifically, upon insertion of the object O, such as the mug in FIG. 5B, the plastic bottle in FIG. 5C, the 12 oz aluminum can in FIG. 5D, and the energy drink aluminum can in FIG. 5E, the side wall 44 deforms outwardly to correspond to the shape of the distal end of the object O. The deformation of the side wall 44 provides an increase in the contact area between the side wall 44 and the object which increases the frictional resistance between the side wall 44 and the object. As such, a higher force is required in order to disrupt the upright vertical orientation of the object.

Figure 6:
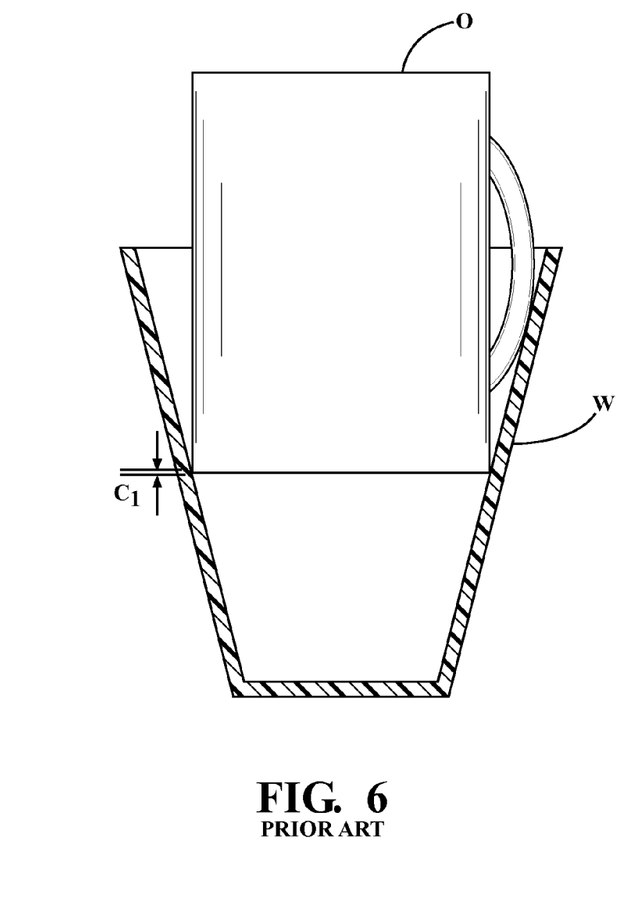
FIG. 6 is a cross sectional view of a conventional cup holder formed of a rigid material.

With reference to FIG. 6, the contact area C1 between the wall W of the previously known cup holders and the object O is less than the contact area C2 between the side wall 44 and the object O, as seen in FIG. 5B. The increase in the contact area increases the frictional resistance between the object O and the side wall 44; therefore, providing an increase in the ability of the receptacle 32 to maintain the proper upright vertical orientation of the object, even when the object is experiencing inertia/momentum forces applied due to the driving operation of the automotive vehicle.

As seen in FIGS. 5C-5E, the contact areas C3-C5 are larger than if the receptacle 32 was merely formed of a rigid material, as the side wall 44 deforms to conform to the shape of the object received therein. Specifically, the diameter of the side wall 44, at the point of contact with the object deformed outwardly to increase as compared to the diameter of the side wall 44, at the same height, when the object is removed. The increase in the diameter of the side wall 44, due to the deformation of the side wall 44, increases the overall contact area between the side wall 44 and the object, which consequently increases the frictional resistance which helps maintain the upright vertical orientation of the object.

The retainer 28 is formed of a flexible material such as a resiliently deformable polypropylene or elastomeric material, illustratively including a crystalline olefinic elastomer alloyed with polypropylene resin that is reinforced with talc. Moreover, the retainer 28 is optionally formed of a composite reinforced polypropylene material or a denatured elastomeric material. Specifically, the retainer 28 is resiliently deformable as the retainer is capable of being deformed, due to the insertion of the object, and returning to the pre-deformation frustoconical shape.

The retainer 28 is optionally formed as a one piece monolithic structure, in an injection molded process, including the first receptacle 30, the second receptacle 32, the plurality of tabs 38, the continuous recessed portion 48. In the alternative configuration, the retainer 28 is formed as two separate pieces that form the first receptacle 30 and the second receptacle 32 having the discontinuous first recessed portion 54 and the second recessed portion 56.

It is appreciated, of course, that the cup holder assembly 14 is not limited in use to a center console assembly 12 of an automotive vehicle. Rather, the cup holder assembly 14 is adapted for use in various configurations inside and out of an automotive vehicle illustratively including: cup holders provided on doors, armrests, seat assemblies, furniture, maritime or aerospace vehicles.

From the foregoing, it can be seen that the present invention provides a cup holder assembly formed of a flexible material and having a receptacle having a frustoconical shape that allows for the retention of objects having various diameters and the proper orientation thereof. Having described the invention, however, many modifications thereto will become apparent to those skilled in the art to It is claimed:

1. A cup holder assembly adapted to retain an object, said cup holder assembly comprising:
a retainer formed of a flexible material; and
a housing having a first aperture and a second aperture, said first aperture having a first cutout and said second aperture having a second cutout,
said retainer having a first upper edge, a first bottom wall, and a first side wall, said first upper edge defining a first open end having a diameter larger than a diameter of said first bottom wall, said first side wall extending between said first bottom wall and said first upper edge to define a frustoconical shape, said first side wall forming a predetermined angle with a vertical axis, said predetermined angle is between 25°-35°, said first side wall deforming outwardly upon insertion of the object to provide frictional resistance to retain an upright orientation of the object, said retainer including a first recessed portion formed in said first side wall, said first recessed portion defined by a pair of first lateral walls and a first traversing wall extending between said first pair of lateral walls, said first pair of lateral walls and said first traversing wall extending obliquely from said first side wall,
said retainer further including a second upper edge, a second bottom wall, and a second side wall, said second upper edge defines a second open end having a diameter larger than a diameter of said second bottom wall, said second side wall extends between said second bottom wall and said upper second edge to define a frustoconical shape, said second side wall forms a second predetermined angle with said vertical axis, said predetermined angle is between 25°-35°, said second side wall deforms outwardly upon insertion of the object to provide frictional resistance to retain an upright orientation of the object, said retainer includes a second recessed portion formed in said second side wall, said second recessed portion defined by a second pair of lateral walls and a second traversing wall extending between said second pair of lateral walls, said second pair of lateral walls and said second traversing wall extending obliquely from said second side wall,
wherein said first recessed portion and said second recessed portion are positioned within said retainer such that said first recessed portion and said second recessed portion are discontinuous,
wherein said retainer is secured to said housing such that said first aperture is in communication with said first open end, said first cutout is in communication with said first recessed portion, said second aperture is in communication with said second open end, and said second cutout is in communication with said second recessed portion.

2. The cup holder assembly of claim of claim 1, wherein said retainer includes a plurality of tabs extending radially outwardly from said first upper edge and said second upper edge, said plurality of tabs are secured to an under side of said housing.

3. The cup holder assembly of claim 1, wherein said predetermined angle is 30°.

4. The cup holder assembly of claim 1, wherein said retainer is formed of a resiliently deformable polypropylene material.

5. The cup holder assembly of claim 1, wherein said pair of lateral walls of said first recessed portion are formed parallel.

6. A cup holder assembly adapted to retain an object, said cup holder assembly comprising:
a retainer formed of a flexible material; and
a housing having a first aperture, a second aperture, and a cutout extending between said first aperture and said second aperture,
said retainer having a first upper edge, a first bottom wall, and a first side wall, said first upper edge defining a first open end having a diameter larger than a diameter of said first bottom wall, said first side wall extending between said first bottom wall and said first upper edge to define a frustoconical shape, said first side wall forming a predetermined angle with a vertical axis, said predetermined angle is between 25°-35°, said first side wall deforming outwardly upon insertion of the object to provide frictional resistance to retain an upright orientation of the object, said retainer includes a first recessed portion formed in said first side wall, said first recessed portion defined by a pair of first lateral walls and a first traversing wall extending between said first pair of lateral walls, said first pair of lateral walls and said first traversing wall extending obliquely from said first side wall,
said retainer includes a second upper edge, a second bottom wall, and a second side wall, said second upper edge defines a second open end having a diameter larger than a diameter of said second bottom wall, said second side wall extends between said second bottom wall and said upper second edge to define a frustoconical shape, said second side wall forms a second predetermined angle with said vertical axis, said predetermined angle is between 25°-35°, said second side wall deforms outwardly upon insertion of the object to provide frictional resistance to retain an upright orientation of the object, said retainer includes a second recessed portion formed in said second side wall, said second recessed portion defined by a second pair of lateral walls and a second traversing wall extending between said second pair of lateral walls, said second pair of lateral walls and said second traversing wall extending obliquely from said second side wall,
wherein said first recessed portion and said second recessed portion are positioned within said retainer such that said first recessed portion and said second recessed portion are connected to form a continuous recessed portion,
wherein said retainer is secured to said housing such that said first aperture is in communication with said first open end, said second aperture is in communication with said second open end, and said cutout is in communication with said continuous recessed portion.

7. The cup holder assembly of claim 6, wherein said retainer includes a plurality of tabs extending radially outwardly from said first upper edge and said second upper edge, said plurality of tabs are secured to an under side of said housing.

8. The cup holder assembly of claim 6, wherein said predetermined angle is 30°.

9. The cup holder assembly of claim 6, wherein said retainer is formed of a resiliently deformable polypropylene material.

10. The cup holder assembly of claim 6, wherein said pair of lateral walls of said first recessed portion are formed parallel.

11. The cup holder assembly of claim 6, wherein said first pair of lateral walls of said first recessed portion and said first pair of lateral walls of said second recessed portion form a continuous pair of lateral walls extending between said first side wall and said second side wall.

12. The cup holder assembly of claim 11, wherein said first traversing wall of said first recessed portion and said second traversing wall of said second recessed portion form a continuous traversing wall extending between said first side wall and said second side wall, and said continuous traversing wall extends between said continuous pair of side walls.

13. The cup holder assembly of claim 12, wherein said continuous traversing wall is positioned between said first upper edge and said first bottom wall and said second upper edge and said second bottom wall.

14. The cup holder assembly of claim 6, wherein said continuous recessed portion is narrower than said diameter of said first open end and said diameter of second open end.

\* \* \* \* \*